United States Patent [19]

Sulzer

[11] 4,429,563
[45] Feb. 7, 1984

[54] MECHANICAL SNUBBER APPARATUS

[75] Inventor: Harry E. Sulzer, Telford, Pa.

[73] Assignee: Anchor/Darling Industries, Inc., Radnor, Pa.

[21] Appl. No.: 316,846

[22] Filed: Oct. 30, 1981

[51] Int. Cl.$^3$ .............................................. G01M 19/00
[52] U.S. Cl. ................................................................ 73/11
[58] Field of Search ...................... 73/11; 188/378–381

[56] References Cited

U.S. PATENT DOCUMENTS

| 4,192,173 | 3/1980 | Ay et al. | 73/11 |
| 4,286,693 | 9/1981 | Sulzer | 188/378 |
| 4,314,473 | 2/1982 | Sulzer | 73/11 |

*Primary Examiner*—Charles A. Ruehl
*Attorney, Agent, or Firm*—Dann, Dorfman, Herrell and Skillman

[57] ABSTRACT

An apparatus for testing the operation of a mechanical snubber having first and second engaged sections, the first section including linear motion input means and the second section including drive means coupled to motion limiting means. A tester housing is coupled to the snubber and has actuator means rotatably supported by the tester housing for engaging the drive means. The actuator means is adapted for engagement by test means for driving the actuator means to drive the drive means for testing the operation of the motion limiting means.

5 Claims, 6 Drawing Figures

POWER DRIVEN WRENCH

MECHANICAL SNUBBER APPARATUS

BACKGROUND OF THE INVENTION

1. Field of the Invention

This invention relates generally to an improved mechanical snubber apparatus and, more particularly, to such a snubber which may be tested in place within a snubber system.

2. Description of the Prior Art

Shock absorbing or damping snubbers are widely used in electric power plants, particularly nuclear power plants, in which pipes or other structures are yieldably attached, by, for example, pipe hangers or other supports, to relatively fixed supporting structure, for example, power plant walls or ceilings. In such applications, the snubbers are operatively connected, usually as part of a strut assembly, between the pipe and the supporting structure. The snubber operates to permit relatively unrestricted motion or movement of the pipe relative to the supporting structure in response to normal slow movements of the pipe, such as might be induced by routine thermal expansion or contraction during plant start-up or shutdown, but to resist or damp rapid vibratory relative motion of the pipe, such as might be induced by seismic or other transient shock or vibration. A typical state-of-the-art snubber of the mechanical type is disclosed and claimed in my U.S. Pat. No. 4,286,693, issued Sept. 1, 1981, and entitled "Mechanical Snubber". While the service life of high quality mechanical snubers of the type described in the aforementioned U.S. patent should be on the order of several decades, their function and proper operation are so important to the safety of the power generating plants that such snubbers must be periodically tested to ensure that they are operating properly. Accordingly, in the past, it has been the general practice in the industry to have technicians periodically remove each snubber, or the snubber and strut assembly, from the system for examination and testing. If the snubber is located in a radiation contaminated area, such as in or near the reactor of a nuclear power plant, the technicians must wear protective clothing and the snubber must be decontaminated to reduce the absorbed radiation to a safe level prior to the testing thereof. Following testing, if the snubber is determined to operate within the limits of the applicable operating specification, the snubber is replaced in the system. If the testing indicates that the snubber is not performing properly, it must be replaced or repaired.

With large snubbers and large snubber and strut assemblies weighing hundreds of pounds, and with some power plants employing hundreds of snubbers, it is evident that the present test procedures are highly cumbersome, time-consuming, and extremely expensive to perform. The problems involved in current snubber test practices are overcome by the present invention which provides an improved mechanical snubber that lends itself to in-place testing. The present invention further provides an apparatus which may be retro-fitted to existing snubbers for testing such snubbers in their normal, operational location in a snubber system. In addition, the present invention is useful for positioning and aligning snubbers, particularly large sized snubbers having high drag forces, to facilitate their proper installation within a snubber system.

SUMMARY OF THE INVENTION

Briefly stated, the present invention comprises a mechanical snubber apparatus having a first snubber section with means for securing the first section to external structure and a second snubber section with means for securing the second snubber section to other external structure. The first and second snubber sections are movable with respect to each other and are responsive to relative movement of the external structures one with respect to the other. The snubber further comprises motion conversion means for mechanically coupling the first and second snubber sections and for converting relative linear motion between the snubber sections into corresponding rotation of a drive means. A motion limiting means is coupled to the drive means for limiting the rotation of the drive means to limit movement between the snubber sections. An actuator means is provided to engage the drive means. The actuator means is adapted for engagement by a test means for driving the actuator means to, in turn, drive the drive means for testing the operation of the motion limiting means of the snubber.

BRIEF DESCRIPTION OF THE DRAWINGS

The foregoing summary, as well as the following detailed description of a preferred embodiment of the present invention, will be better understood when read in conjunction with the accompanying drawings, in which.

DESCRIPTION OF A PREFERRED EMBODIMENT

Figure 1:
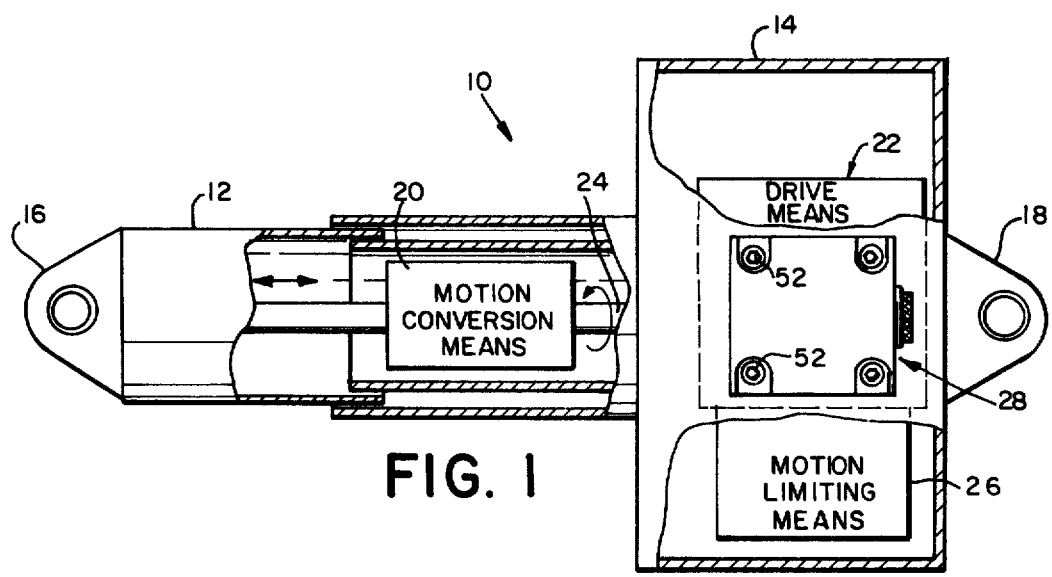
FIG. 1 is a partially schematic, plan view, with parts broken away, of a mechanical snubber apparatus embodying the present invention.

Referring to the drawings, and particularly to FIG. 1, there is shown in accordance with the present invention a mechanical snubber apparatus or snubber 10. In the present embodiment, the snubber 10 is of a type similar to the snubber disclosed and claimed in U.S. Pat. No. 4,286,693, issued Sept. 1, 1981, and entitled "Mechanical Snubber". However, it will be appreciated by those skilled in the art and it should be clearly understood that the present snubber tester invention is not necessarily limited to use with a snubber of the type disclosed in the aforementioned U.S. patent but may be equally applicable to and used with many other types of snubbers, for example, a ball-screw type snubber.

As shown, the snubber 10 comprises two telescoping engaged sections, a first generally tubular snubber section 12 and a second snubber section 14. On the nonengaged end of each of the snubber sections 12 and 14 are terminal means comprising lugs 16 and 18, respectively. The lugs 16 and 18 function to secure the respective snubber sections 12 and 14 to external structures, for example, a pipe and supporting wall or structure, respectively, by means of a conventional clevis and pin arrangement (not shown). Within the second snubber section 14 is a motion conversion means, shown schematically by rectangle 20, for mechanically coupling the first and second snubber sections 12 and 14 and for converting relative linear motion between the snubber sections into rotary motion of a shaft 24 forming part of a drive means, generally designated 22. The motion conversion means 20 may comprise, for example, a rack and pinion as disclosed in the aforesaid U.S. patent or may be of any other suitable known or conventional type motion conversion means, such as a traditional ball-screw arrangement.

In addition to the shaft 24, the drive means 22 includes suitable gearing or other means for the purpose of engaging or actuating suitable motion limiting means 26. The motion limiting means 26 may comprise the escapement wheels and engagement means as described and depicted in the aforementioned U.S. patent or any other conventional motion limiting means of the type well known in the art. The purpose of the motion limiting means 26 is to provide the desired snubbing action by damping the rotation of the shaft 24 under certain seismic shock, violent vibrations and other rapid changes in spacing between the pipe and supporting structure, thereby limiting relative movement between the snubber sections and, hence, the pipe and supporting structure.

The structure thus far described has been a mechanical snubber constructed generally in accordance with the aforementioned U.S. patent. Further details of the structure and operation of such a snubber may be obtained by reference to that patent, which is hereby incorporated herein by reference. The present invention comprises an apparatus for testing the operation of a mechanical snubber and will hereinafter be described with reference to the testing of the mechanical snubber described above, it being understood that the present invention is not limited to the testing of the particular type of snubber shown in the drawings, but may be employed in the testing of other types of snubbers as previously mentioned.

Figure 2:
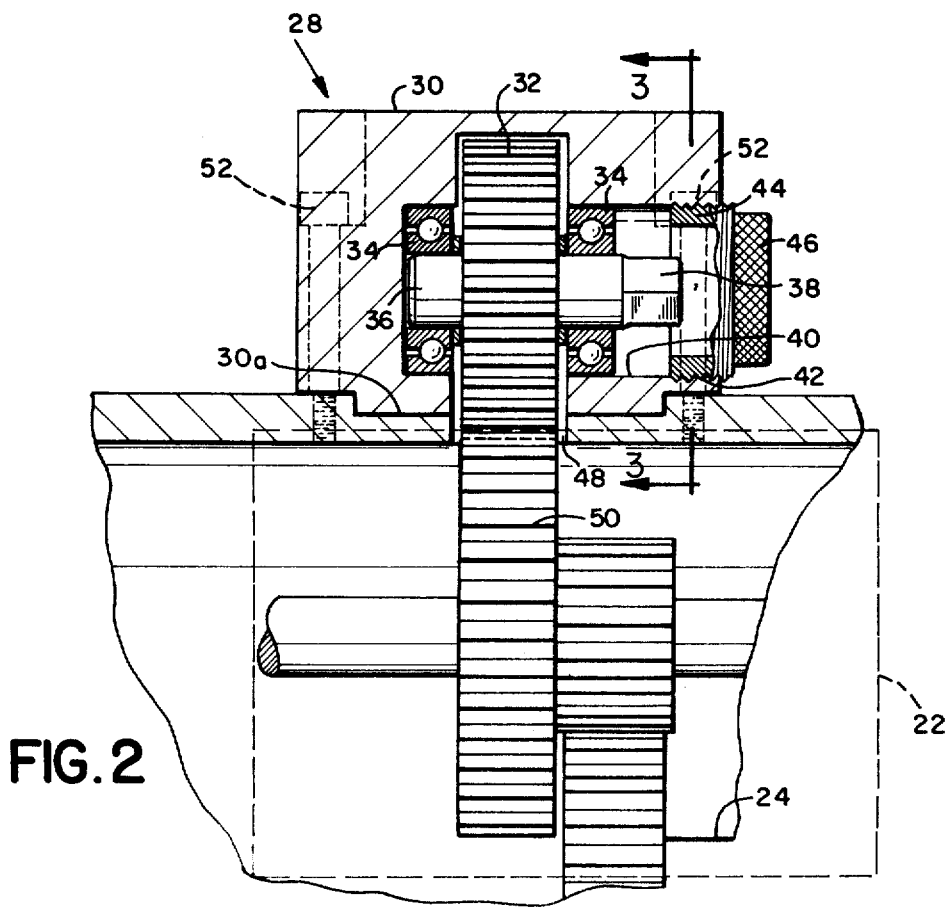
FIG. 2 is an enlarged sectional view of a portion of the snubber of FIG. 1 taken along line 2—2 of FIG. 1.

Referring now to FIGS. 1 and 2, there is shown a tester apparatus, generally designated 28, for testing the operation of the above-described mechanical snubber, comprising a tester housing 30 adapted to be permanently or temporarily coupled to the second snubber section 14 by screws or other suitable means. Preverably, the second snubber section has a non-circular recess in the outside of its housing adapted to receive an extension 30a of the tester housing to assure a secure arrangement when the snubber is tested. An actuator gear 32 is rotatably supported within the tester housing 30 by a suitable central shaft 36 journaled for rotation within suitable conventional bearings 34 supported by tester housing 30. For purposes which will hereinafter become apparent, one end of the actuator gear shaft 36 includes a suitable drive stud 38. The tester housing 30 further includes a generally circular opening 40 into which the drive stud 38 extends to be accessible from outside the tester housing. The circular opening 40 is suitably threaded at 42 for engaging a mating threaded portion 44 on the outside of a sealing plug 46, which is employed to close the circular opening 40 during periods of time when the snubber 10 is not being tested.

The actuator gear 32 extends through a suitable opening 48 in the second snubber section 14 to engage a gear 50 forming a part of the snubber drive means 22. With the plug 46 removed from the cicular tester housing opening 40, a suitable test means, for example, a manual torque wrench or suitable power driven torque wrench (not shown in FIG. 2 but shown in FIG. 4) may be employed to drive the drive stud 38 to rotate the actuator gear 32 to drive the drive means gear 50 into rotation. The rotation of the drive means gear 50 in turn drives the motion limiting means 26 to test the retarding action of the snubber. In addition, the rotation of the drive means gear 50 drives the motion conversion means 20 (to move the snubber sections relative to each other) to further test the operation of the snubber. The drag acceleration of the snubber may also be tested by employing a fixed torque or fixed rpm test means to turn the drive stud 38 and measuring the length of snubber extension or contraction response which occurs and/or the time involved in the response and comparing the results to known or expected specifications for the particular snubber, as provided by the snubber manufacturer. It should be appreciated that, when testing the operation of the snubber with the tester apparatus 28, it is preferable to have one of the snubber sections disconnected from its associated pipe or supporting structure, so that the forces applied to the snubber causing relative movement of the snubber sections does not cause movement of the piping relative to the supporting structure by operation of the snubber.

By employing the snubber testing apparatus 28 in this manner, the entire snubber operation may be tested along the entire length of its stroke in either or both directions to extend and retract the snubber 10 in order to ensure its proper operation throughout its entire operating range in either of its two directions of movement. A snubber may be tested in this manner in the factory just after its fabrication or at any later time, for example, just prior to installation in a power generation facility. In addition, once a snubber has been installed and is operational, it can be tested in place in the same manner simply by first removing one end of the snubber from the external structure to which it is attached, for example, by removing an attaching pin from a clevis structure. Furthermore, by employing the testing apparatus in this manner, it is possible to easily adjust the snubber sections relative to each other and to thereby adjust the overall length of the snubber to facilitate the installation and alignment of the snubber in differing initial snubber length and orientation requirements.

Figure 3:
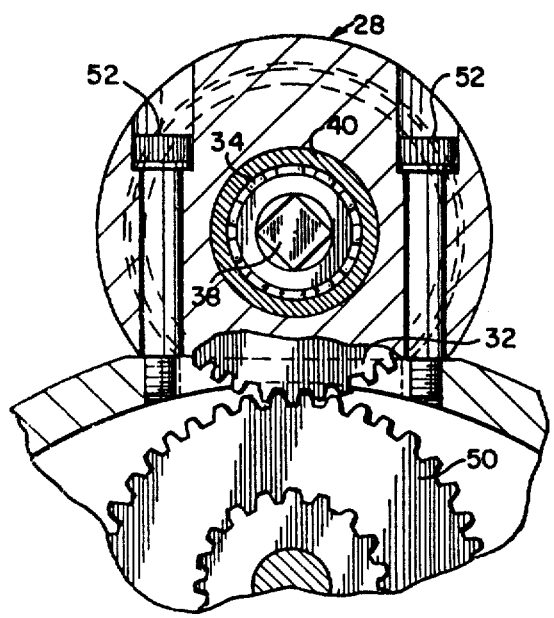
FIG. 3 is a sectional view of a portion of the snubber of FIG. 2 taken along line 3—3 of FIG. 2.

The snubber testing apparatus 28 may be permanently installed as an integral part of the snubber 10 at the time the snubber is initially constructed. Alternatively, the snubber testing apparatus 28 may be installed on a snubber at a later date and may be retrofitted onto snubbers already in the field and operating. The snubber testing apparatus 28 is retained in place on the snubber 10 by any suitable means, for example, four machine screws 52, as shown in FIG. 3. Retrofitting such a snubber testing apparatus onto an existing snubber, whether in operation or not, may be accomplished by simply cutting an appropriately sized opening 48 at the proper location in the second snubber section to allow proper engagement of the tester actuator gear 32 with the drive means gear 50 of the snubber, drilling suitable openings for the retaining machine screws 52 and applying the snubber testing apparatus to the snubber as shown in FIGS. 2 and 3.

Figure 6:
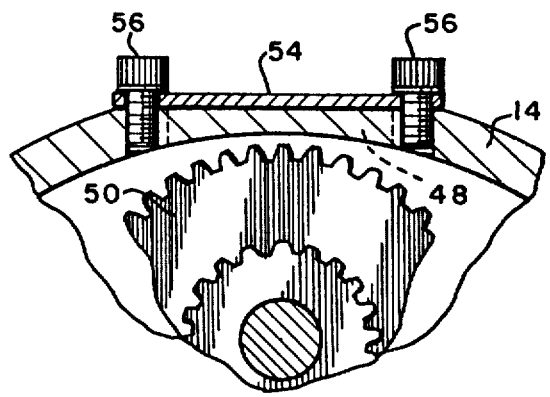
FIG. 6 is a sectional view similar to FIG. 3 but with the tester housing removed from the snubber and showing a cover plate closing the opening into the snubber housing.

Alternatively, it may be desirable to employ a single snubber testing apparatus 28 in conjunction with a plurality of snubbers, only one of such snubbers being tested at a particular time. In employing the snubber testing apparatus in this manner, it is necessary to have a suitably sized and positioned opening 48 in the second section 14 of each of the snubbers to be tested. A suitably sized cover plate 54 (FIG. 6) is positioned to cover the opening 48 in the second section 14 of each of the snubbers during the periods of time when the snubbers are not being tested. The cover plate 54 may be retained in position covering the snubber opening 48 by means of four machine screws 56 arranged to engage the same openings as are engaged by machine screws 52, which maintain the snubber testing apparatus 28 in position relative to the snubber 10. Testing of a particular snubber is accomplished by removing the cover plate 54, placing the snubber testing apparatus 28 in position so that the actuator gear 32 extends into the snubber to engage the drive means gear 50, tightening the retaining machine screws 52 and turning the drive stud 38 to test the snubber. Subsequent to the testing of the snubber, the snubber testing apparatus 28 is removed and the cover plate 54 is replaced over the opening 48 to prevent dust, dirt and the like from getting into the snubber. In this manner, a technician may employ one snubber testing apparatus 28, by moving it from snubber to snubber, to test a plurality of snubbers either at a conveniently located centralized testing station or at the location of installed snubbers.

Figure 4:
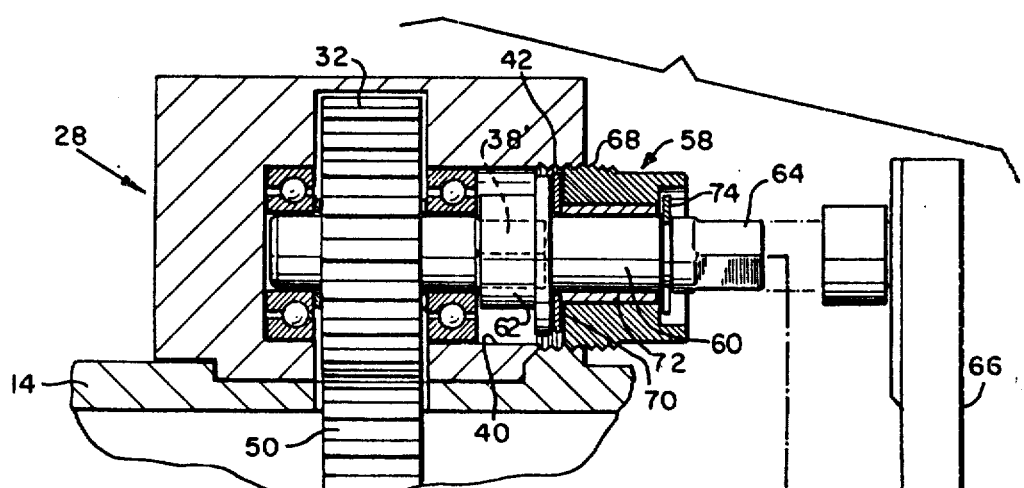
FIG. 4 is a fragmentary sectional view similar to FIG. 2 but showing a coupling apparatus added thereto and showing a torque wrench or alternatively a power driven wrench adapted to be engaged with the coupling apparatus.
Figure 5:
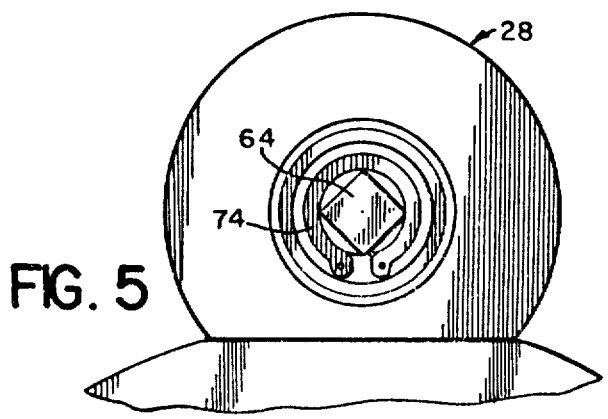
FIG. 5 is a side elevation view of FIG. 4 showing the end of the coupling apparatus without the torque wrench.

Because of the critical nature of snubbers employed in power plants, and particularly nuclear power plants, it may be desirable to prevent unauthorized individuals from being able to utilize the snubber testing apparatus 28. To this end, the snubber testing apparatus 28 may be slightly modified to preclude such unauthorized usage. As shown in FIGS. 4 and 5, a modified snubber testing apparatus 28 is shown employing a specialized drive stud 38' of a non-standard size or non-standard shape. In this manner, the drive stud 38' may not be engaged by a standard torque wrench or the like for turning or rotating the actuator gear 32.

In order to allow authorized personnel to operate the snubber testing apparatus 28, a special coupling means or adapter apparatus 58 is provided. The special adapter apparatus 58 comprises a generally elongated cylindrical member 60 having on one end a socket or inverted pickup 62 of a size and shape which complements or mates with the size and shape of the stud drive 38'. The other end of the elongated member 60 has a standard sized and shaped drive stud 64, which may be suitably engaged by a torque wrench 66.

The special adapter apparatus 58 may be temporarily retained in place by means of suitably threading 68, which engages the threading 42 in the circular opening 40 of the tester housing 30. Suitable bearings 70 and 72 may be employed for supporting the elongaged member 60 within the special adapter apparatus 58. A suitable retaining ring 74 of a type well known in the art may be employed to retain the bearings 70 and 72 in place.

From the foregoing description, it can be seen that the present invention provides an apparatus for testing the operation of a mechanical snubber which lends itself to in-place field testing. The snubber testing apparatus may be retrofitted to existing snubbers and may also be used for positioning and aligning snubbers, particularly large size snubbers having heavy drag forces, to facilitate their proper installation within a snubber system for a nuclear power plant, for example. It will be recognized by those skilled in the art that changes may be made to the above-described embodiment without departing from the broad inventive concepts of the invention. It is understood, therefore, that this invention is not limited to the particular embodiment disclosed, but it is intended to cover all modifications which are within the scope and spirit of the invention as defined by the appended claims.

I claim:

1. An apparatus for testing the operation of a mechanical snubber having first and second sections engaged one with the other, the first section including linear motion input means and the second section including a drive gear coupled to motion limiting means, the apparatus comprising:
   a tester housing adapted to be coupled to the snubber; and
   actuator gear means rotatably supported by the tester housing, said actuator gear means being engageable with the drive gear and being adapted for engagement by test means for driving the actuator gear means to rotate the drive gear for testing the operation of the motion limiting means.

2. A mechanical snubber comprising:
   a first snubber section having means for securing said section to external structure;
   a second snubber section having means for securing said second section to other external structure;
   said first and second snubber sections being movable with respect to each other and being responsive to relative movement of said external structures one with respect to the other;
   motion conversion means for mechanically coupling said first and second snubber sections and having drive means; said motion conversion means converting relative linear motion between said snubber sections into corresponding rotation of said drive means;
   motion limiting means coupled to the drive means for limiting the rotation of the drive means to limit movement between the snubber sections; and
   actuator means engageable with the drive means, said actuator means being adapted for engagement by test means for driving the actuator means to drive the drive means for testing the operation of the motion limiting means.

3. The apparatus as recited in claims 1 or 2 wherein the test means comprises a torque wrench.

4. The apparatus as recited in claims 1 or 2 wherein the test means comprises a power driven wrench adapted to operate at a predetermined rotational velocity.

5. The mechanical snubber as recited in claim 2 further including coupling means engageable between the actuator means and the test means for coupling the actuator means to the test means.

* * * * *